(12) United States Patent
Odom

(10) Patent No.: US 10,513,159 B2
(45) Date of Patent: Dec. 24, 2019

(54) TRAILER COUPLER LOCK

(71) Applicant: James Milton Odom, Tulsa, OK (US)

(72) Inventor: James Milton Odom, Tulsa, OK (US)

( * ) Notice: Subject to any disclaimer, the term of this patent is extended or adjusted under 35 U.S.C. 154(b) by 0 days.

(21) Appl. No.: 14/718,211

(22) Filed: May 21, 2015

(65) Prior Publication Data

US 2016/0339751 A1    Nov. 24, 2016

(51) Int. Cl.
*B60D 1/60* (2006.01)

(52) U.S. Cl.
CPC ........................ *B60D 1/60* (2013.01)

(58) Field of Classification Search
CPC .................... B60D 1/605; B60D 1/60
USPC ............................................. 280/507
See application file for complete search history.

(56) References Cited

U.S. PATENT DOCUMENTS

| | | | | |
|---|---|---|---|---|
| 2,656,706 A * | 10/1953 | Lucas | .................. | B62D 53/085 280/434 |
| 2,785,564 A * | 3/1957 | Carrato | ................ | B62D 53/085 70/232 |
| 3,269,159 A * | 8/1966 | Young | .................. | B62D 53/085 280/433 |
| 3,605,457 A * | 9/1971 | Foster | ..................... | B60D 1/60 280/507 |
| 4,141,569 A * | 2/1979 | Dilk | ......................... | B60D 1/60 280/507 |
| 4,300,373 A * | 11/1981 | Camos | ................... | E21B 33/03 166/113 |
| 4,631,938 A * | 12/1986 | Johnson | ................ | E05B 13/001 70/158 |
| 5,412,962 A * | 5/1995 | Thompson | .............. | F16K 35/10 109/20 |
| 5,421,601 A * | 6/1995 | Hinze | ...................... | B60D 1/60 280/507 |
| 5,544,505 A * | 8/1996 | McIntosh | ............. | E05B 67/383 70/14 |
| D388,383 S * | 12/1997 | Foster | ..................... | B60D 1/60 D12/162 |
| 5,775,139 A * | 7/1998 | Sellers | ..................... | B60D 1/60 280/507 |
| 6,598,432 B1 * | 7/2003 | Dwyer | ..................... | B60D 1/60 280/507 |
| 6,626,016 B2 * | 9/2003 | Nilges | ...................... | B60D 1/60 70/14 |
| 6,766,671 B2 * | 7/2004 | Haczynski | ............. | E05B 67/36 70/23 |
| 6,976,695 B1 * | 12/2005 | Smith, III | ............... | B60D 1/28 280/507 |
| 7,290,415 B2 * | 11/2007 | Rosenberg | ............ | E05B 67/383 70/34 |
| D561,005 S * | 2/2008 | Rohde | ..................... | E05B 67/36 D8/345 |
| 7,610,784 B2 * | 11/2009 | Rohde | ..................... | E05B 17/18 70/34 |
| 7,635,143 B2 * | 12/2009 | Pappalardo | ............. | B60D 1/60 280/507 |

(Continued)

*Primary Examiner* — Tony H Winner
*Assistant Examiner* — Michael R Stabley
(74) *Attorney, Agent, or Firm* — Cornelius P. Dukelow

(57) ABSTRACT

A hinged lock for trailer couplers utilizing a hasp that mates with "puck" style locks. The hinged lock enclosure fully encases the trailer coupler and may have apertures of differing shapes and sizes allowing the lock to mate with various trailer couplers.

1 Claim, 17 Drawing Sheets

(56) References Cited

U.S. PATENT DOCUMENTS

| | | | | |
|---|---|---|---|---|
| 8,757,654 B2* | 6/2014 | Lachance | ............... | B60D 1/28 |
| | | | | 280/507 |
| 9,033,358 B1* | 5/2015 | Williamson | ............ | B60D 1/60 |
| | | | | 280/507 |
| 9,206,903 B2* | 12/2015 | Huard | ................... | F16J 15/164 |
| 9,238,528 B2* | 1/2016 | Fang | ..................... | B65D 51/00 |
| 2010/0230932 A1* | 9/2010 | Pratt | ....................... | B60D 1/06 |
| | | | | 280/507 |
| 2011/0048083 A1* | 3/2011 | Adolph | .................. | B60D 1/60 |
| | | | | 70/58 |
| 2014/0028000 A1* | 1/2014 | Lachance | ............... | B60D 1/28 |
| | | | | 280/507 |

* cited by examiner

TRAILER COUPLER LOCK

CROSS-REFERENCE TO RELATED APPLICATIONS

N/A

STATEMENT REGARDING FEDERALLY SPONSORED RESEARCH OR DEVELOPMENT

N/A

THE NAMES OF THE PARTIES TO A JOINT RESEARCH AGREEMENT

N/A

REFERENCE TO A "SEQUENCE LISTING," A TABLE, OR A COMPUTER PROGRAM LISTING APPENDIX SUBMITTED ON COMPACT DISC AND AN INCORPORATION-BY-REFERENCE OF THE MATERIAL ON THE COMPACT DISC

N/A

BACKGROUND

The present art relates generally to locking devices. More particularly, the present art relates to locking devices for trailer couplers.

SUMMARY

It is estimated that 40,000 farm stock trailers are stolen in the United States every year. It is also estimated that 25-30% of all utility trailers sold in the United States are purchased to replace a stolen trailer. Because trailers often contain valuable property (tools, equipment, vehicles, etc.), trailer thefts have a large bearing on insurance rates and the economy.

The basic premise of the trailer coupler lock disclosed herein is a welded steel box enclosure constructed in two halves that are connected on one side by a welded-on hinge and secured on another side by a welded-on high security hasp surround that mates with what is commonly referred to as a "puck" style high security lock. The steel box enclosures have varying sizes ranging from approximately 4-inches×4-inches×4-inches up to approximately 12-inches×12-inches×12-inches. The steel box enclosures may be of any size or shape as long as they create an inner cavity of sufficient size to enclose a trailer coupler. In the primary embodiment, all sides of the steel box enclosure are closed except one of the sides having the seam of the two halves—on that side there is an aperture that varies in size and shape. Other embodiments of the trailer coupler lock may include multiple apertures or apertures on multiple sides of the box enclosure. The different sizes and shapes of apertures correspond to specific trailer couplers and may be round, square, rectangular, or a combination of shapes. Some specific examples of hasp surrounds that may be used are: MasterLock model 770, CCL model B930, Trimax model THSP2C, and other similar makes and models of similar fabrication. The "puck" style locks that fit these hasp surrounds are the MasterLock model 6271 and other similar makes and models of similar fabrication. This trailer coupler lock is unique from other trailer coupler locks in that the use of the particular hasp surround in combination with the "puck" style lock allows for a fully encased trailer coupler. The trailer coupler lock disclosed herein cannot be defeated by bolt cutters or other conventional means such as pry bars or hammers. Power tools or cutting torches are required to defeat the disclosed trailer coupler lock. Almost all other trailer coupler locks can be defeated with bolt cutters, hammers, or pry bars.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
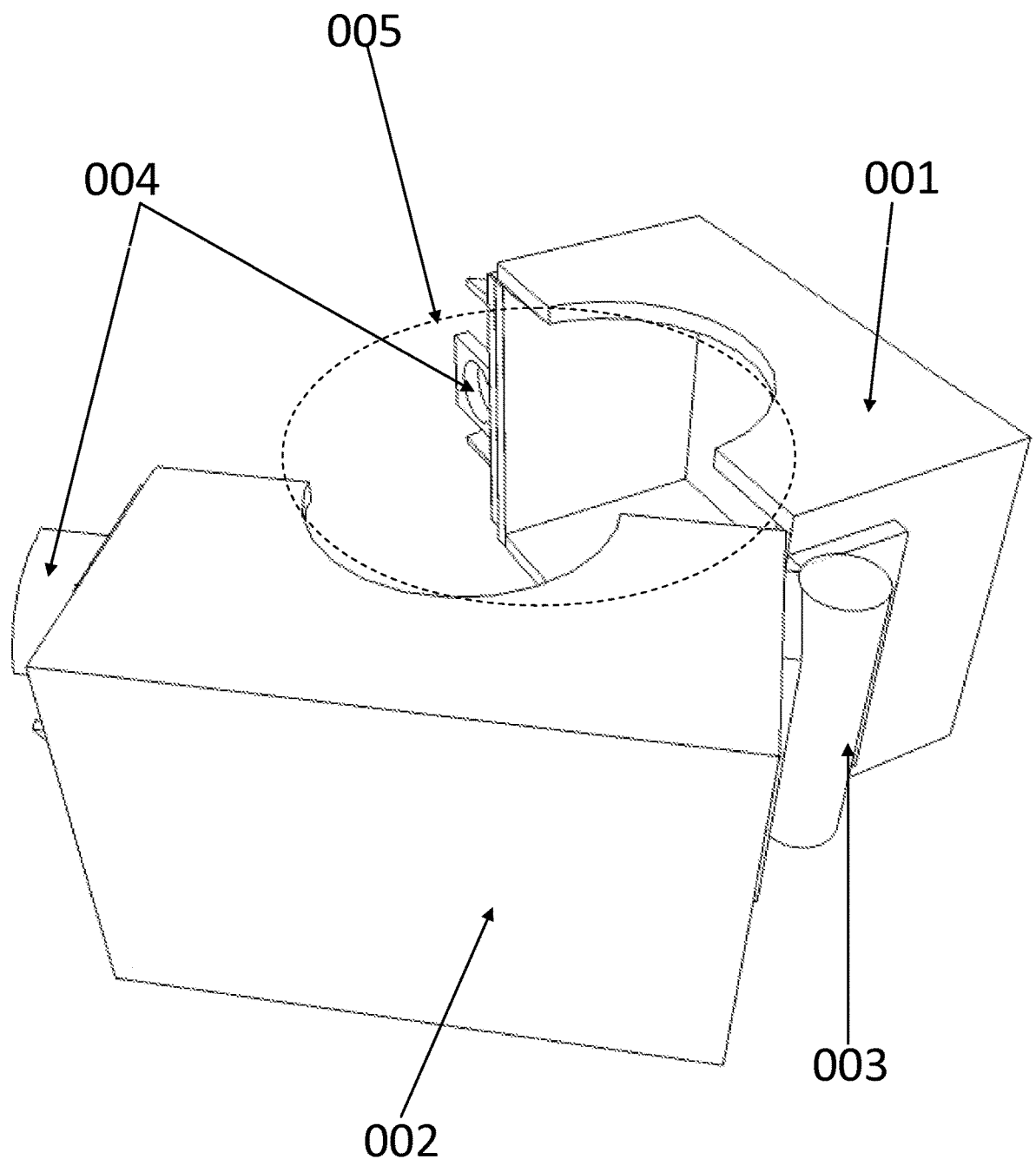
FIG. 1 illustrates a perspective view of an embodiment of the trailer coupler lock in an open position with the hinge in view.
Figure 2:
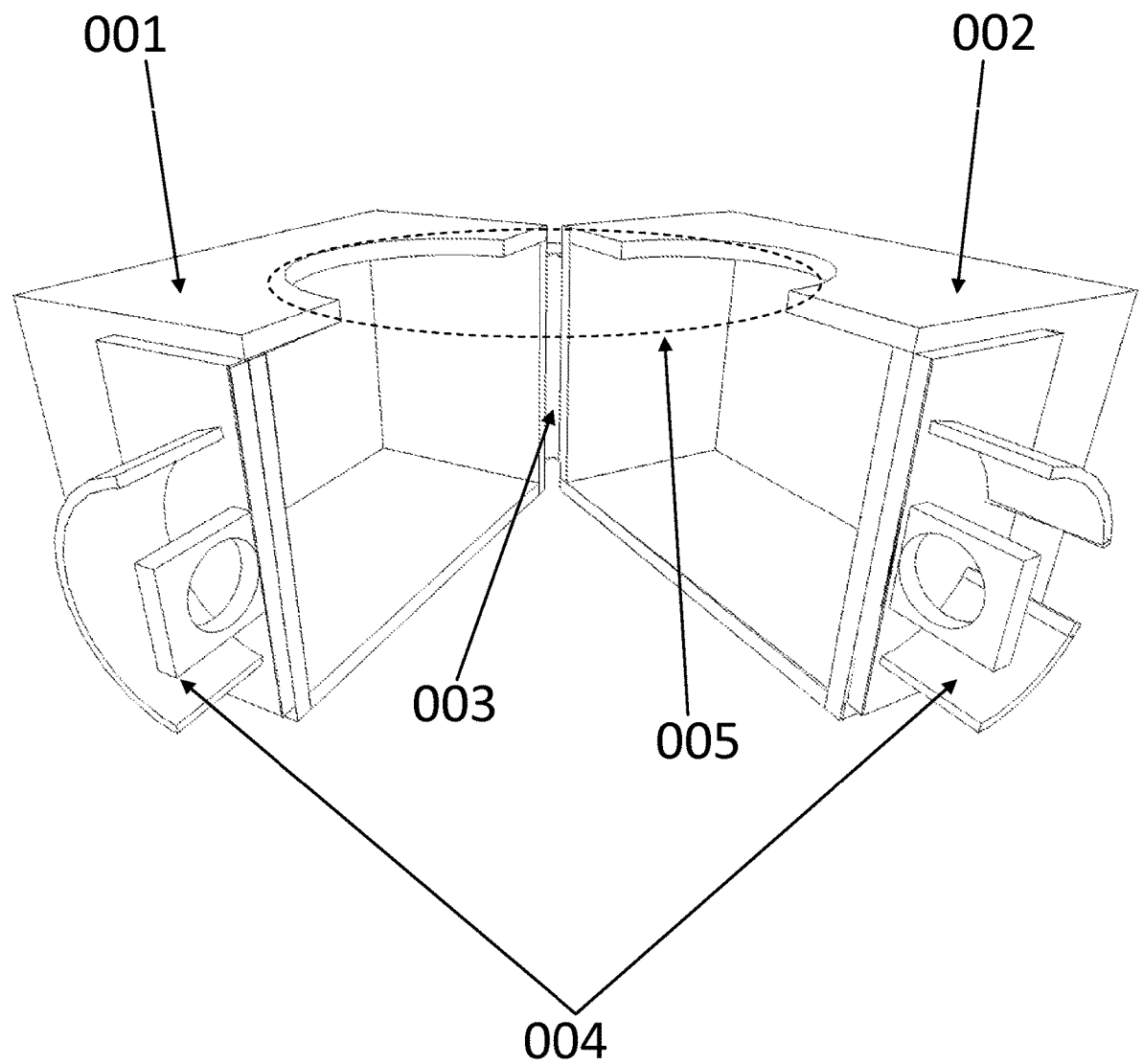
FIG. 2 illustrates a perspective view of an embodiment of the trailer coupler lock in an open position with the hasp surround in view.
Figure 3:
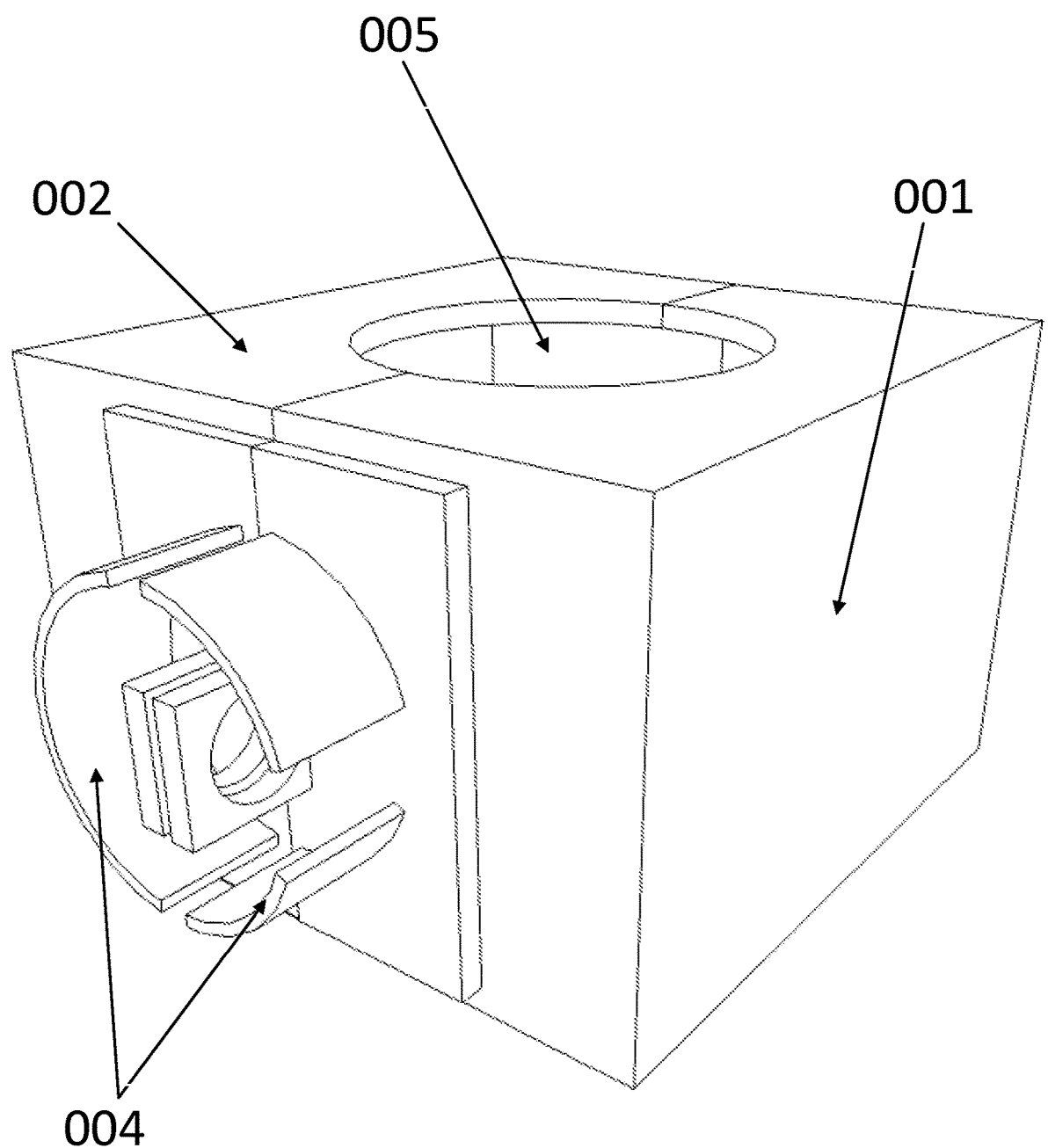
FIG. 3 illustrates a perspective view of an embodiment of the trailer coupler lock in a closed position with the hasp surround in view.
Figure 4:
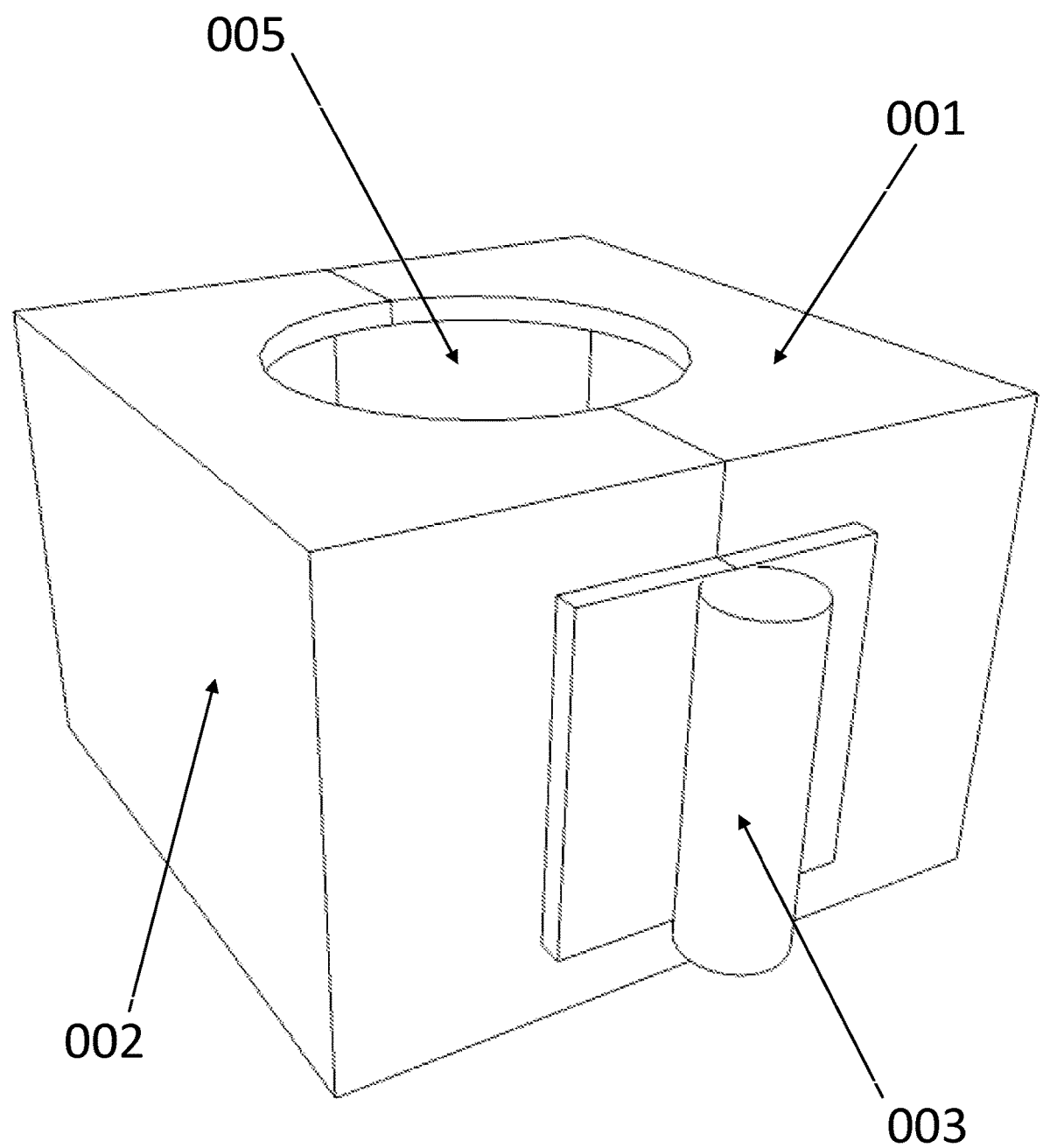
FIG. 4 illustrates a perspective view of an embodiment of the trailer coupler lock in a closed position with the hinge in view.

The embodiments discussed herein are merely illustrative of specific manners in which to make and use the claimed subject matter and are not to be interpreted as limiting the scope thereof.

The steel box enclosure is preferably made from ³⁄₁₆" or ¼" tube steel or plate steel that is sheered, cut and/or bent to form the different sized box enclosure parts. The box enclosure may be of any size or shape as long as it creates an inner cavity of sufficient size to enclose a trailer coupler. Box enclosure parts are welded together to form two separate enclosure box halves. The two enclosure box halves are then linked by a steel hinge that is welded onto the two halves permitting the two enclosure box halves to be in a selectively open or closed position. The steel hinge is a common steel hinge and known in the art. The hinge is additionally secured by welding the hinge pin into place so that it cannot be removed and by "tack" welding the hinge leafs. On a different side of the box where the two halves abut, one half of a hasp surround (such as MasterLock model 770, CCL model B930, Trimax model THSP2C, and other similar makes and models of similar fabrication) is attached to each of the two halves of the steel enclosure box by welding the hasp surround halves into place in such a way that the locking tabs of each half of the hasp surround are properly aligned in order to accept a "puck" style lock (such as MasterLock model 6271 and other similar makes and models of similar fabrication). The hasp surround is a common hasp surround and known in the art. An aperture is then cut into one of the enclosure box sides having a seam that runs along that side. (In the alternative, the aperture cuts may be made before the enclosure box parts are welded together.) The apertures may be circular, square, or varied in their shape to fit around the various makes and models of trailer couplers. The aperture may also extend to a side of the enclosure box that does not have a seam. Support pieces may also be welded onto the interior of the enclosure to provide reinforcement to portions of the enclosure box weakened by the aperture cuts.

Referring to the drawings in detail, FIG. 1 to FIG. 8 illustrate perspective views of the trailer coupler lock in open and closed positions with the hinge and hasp surround in view. In the preferred embodiment, the box enclosure is formed of a first piece 001 and a second piece 002 of plate or tube steel cut and bent and welded to form a box with the desired dimensions. In the present embodiment, the box enclosure is a cuboid. The first piece and second piece are linked on one end by a steel hinge 003 that is welded onto the two halves of the box enclosure. A hasp surround 004 is located on a side of the box enclosure where the two halves of the box enclosure abut when in a closed position. In the present embodiment, the hasp surround is located opposite the hinge, but in other embodiments the hasp surround may be located adjacent the hinge. One half of the hasp surround 004 is affixed (preferably by welding) onto the first piece 001 and the other half of the hasp surround 004 is affixed (preferably by welding) onto the second piece 002. The box enclosure includes an aperture 005 located on a side of the box enclosure where said two pieces abut when in a closed position. The aperture may be any of the various shapes or shape combinations disclosed herein and may be cut into multiple sides of the enclosure box.

Figure 5:
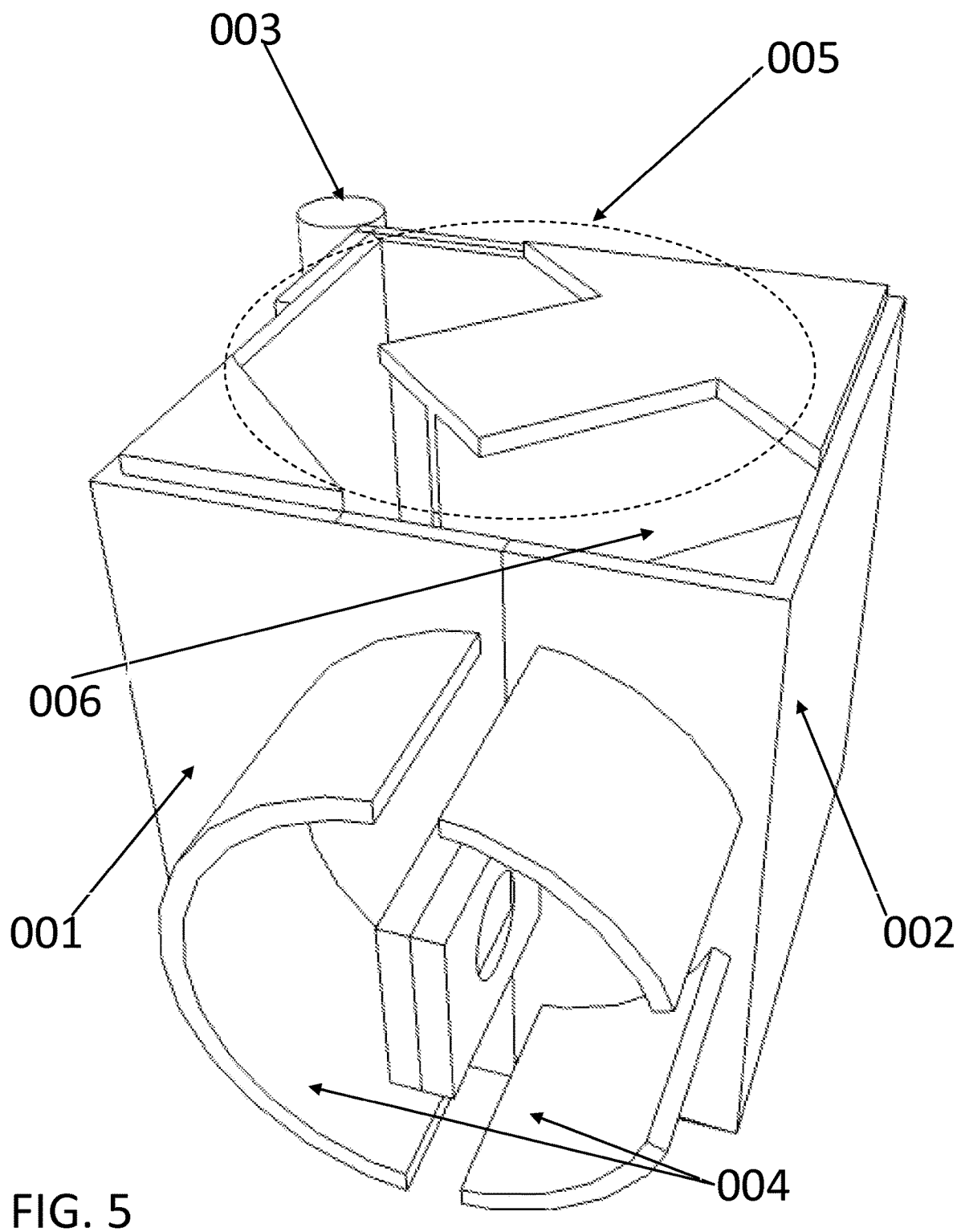
FIG. 5 illustrates a perspective view of an embodiment of the trailer coupler lock in a closed position with the hasp surround in view and a 10-sided irregular polygon aperture cut.
Figure 6:
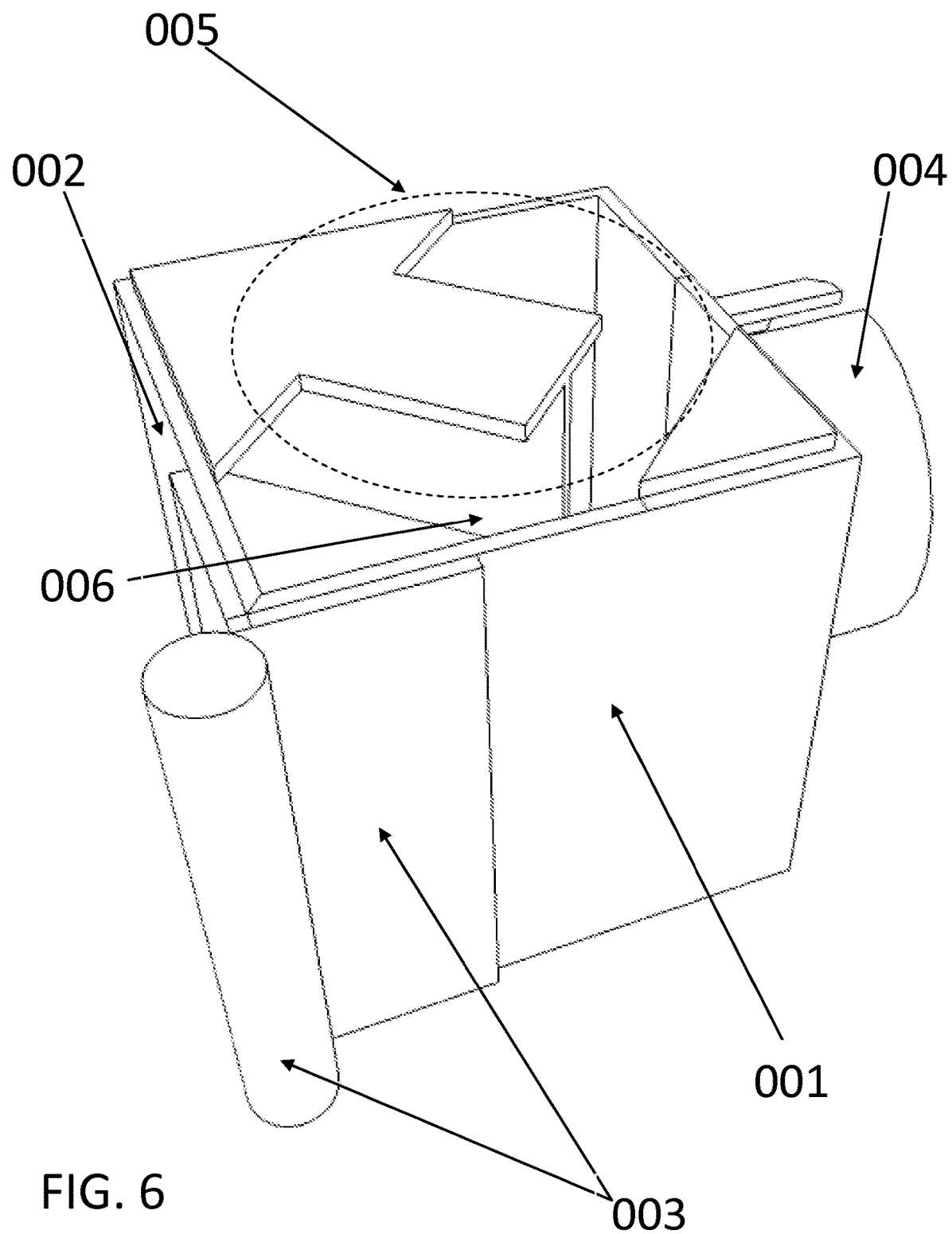
FIG. 6 illustrates a perspective view of an embodiment of the trailer coupler lock in a closed position with the hinge in view and a 10-sided irregular polygon aperture cut.

FIG. 5 and FIG. 6 illustrate a perspective view of the trailer coupler lock in a closed position with the hasp surround and hinge in view and a 10-sided irregular polygon aperture cut. FIG. 5 and FIG. 6 further illustrate a support piece 006 affixed (preferably by welding) to the interior of the box enclosure to provide reinforcement to portions of the box enclosure weakened by the aperture cuts.

Figure 7:
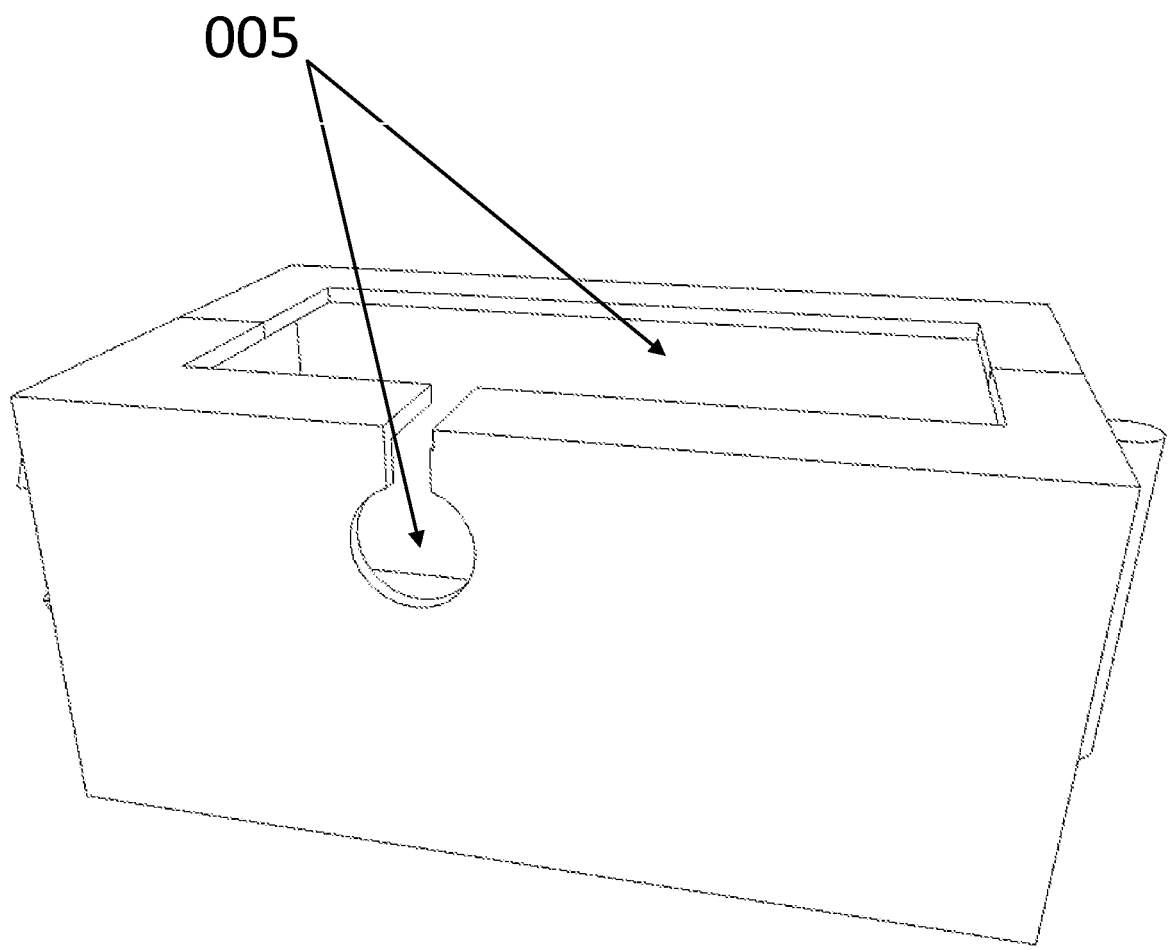
FIG. 7 illustrates a perspective view of an embodiment of the trailer coupler lock in a closed position with a rectangular aperture cut and linked side circle aperture cut.
Figure 8:
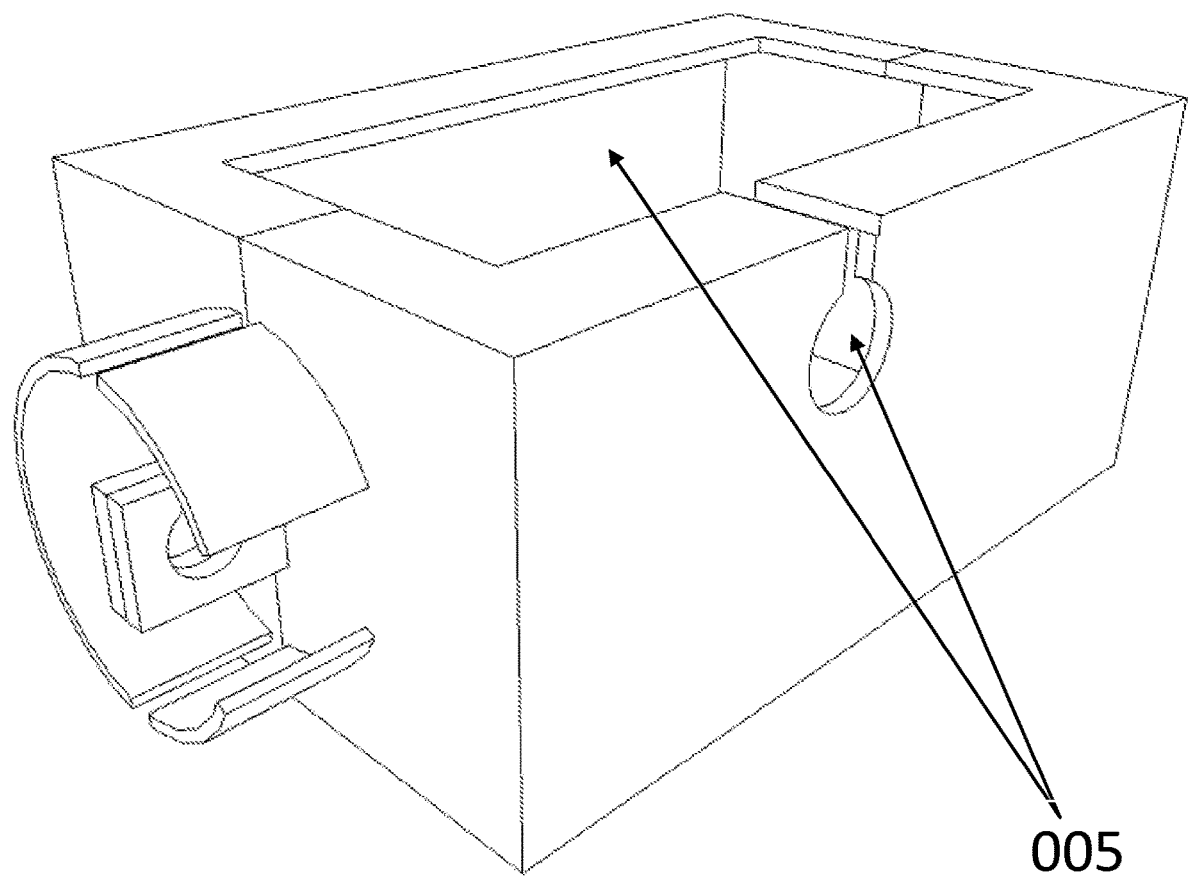
FIG. 8 illustrates a perspective view of an embodiment of the trailer coupler lock in a closed position with a rectangular aperture cut and linked side circle aperture cut.

FIG. 7 and FIG. 8 illustrate perspective views of the trailer coupler lock in a closed position with a rectangular aperture cut and linked side circle aperture cut 005 and further illustrate an aperture cut into multiple sides of the enclosure box.

Figure 9:
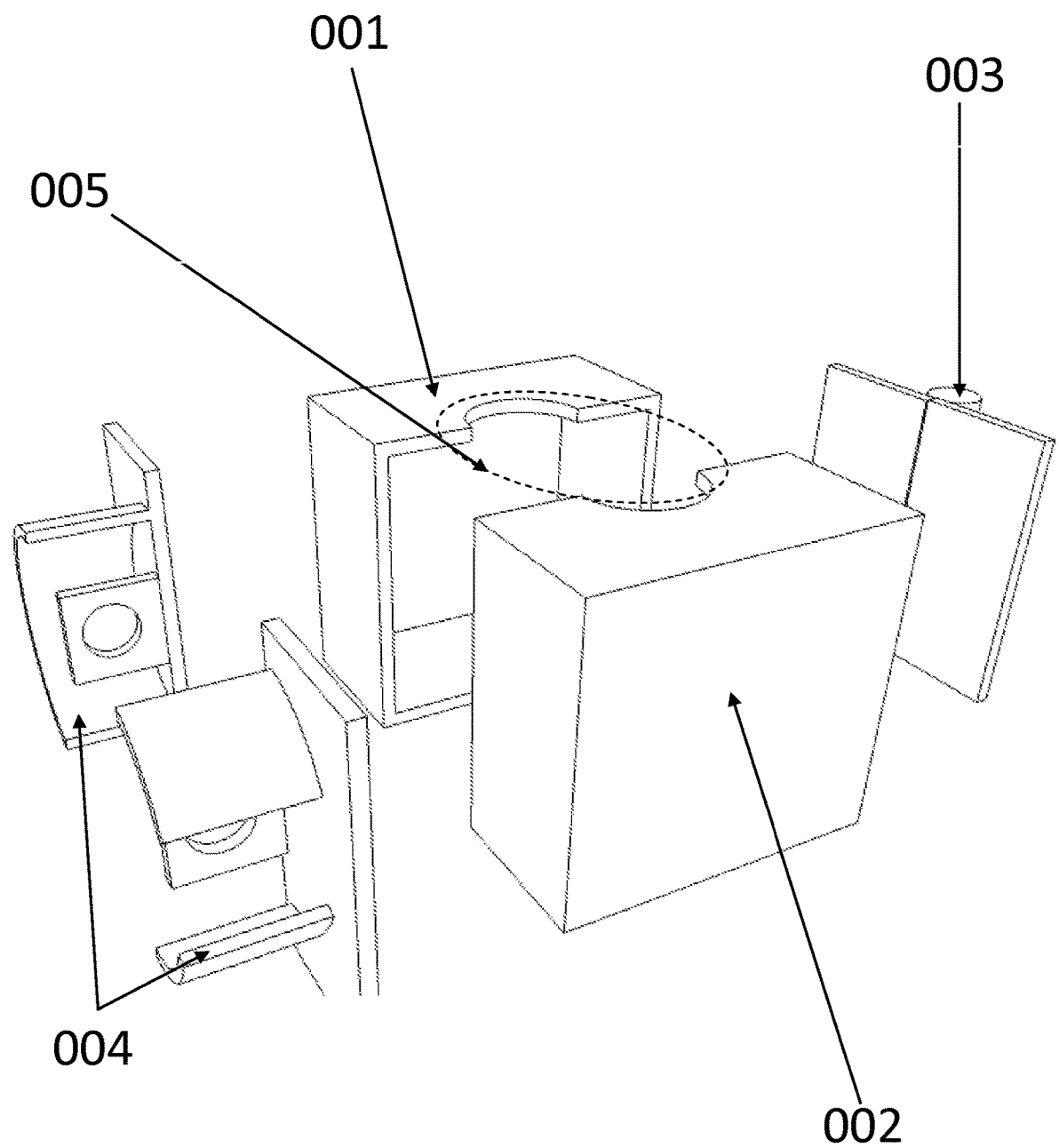
FIG. 9 illustrates an exploded view of an embodiment of the trailer coupler lock.

FIG. 9 illustrates an exploded view of the trailer coupler lock. Whereas, the elements of the trailer coupler lock have been shown and described in previous figures, FIG. 9, nevertheless, is an exploded view which shows the manner in which the various elements interconnect with each other as previously described in relation to previous figures—chiefly FIGS. 1 to 4.

Figure 10:
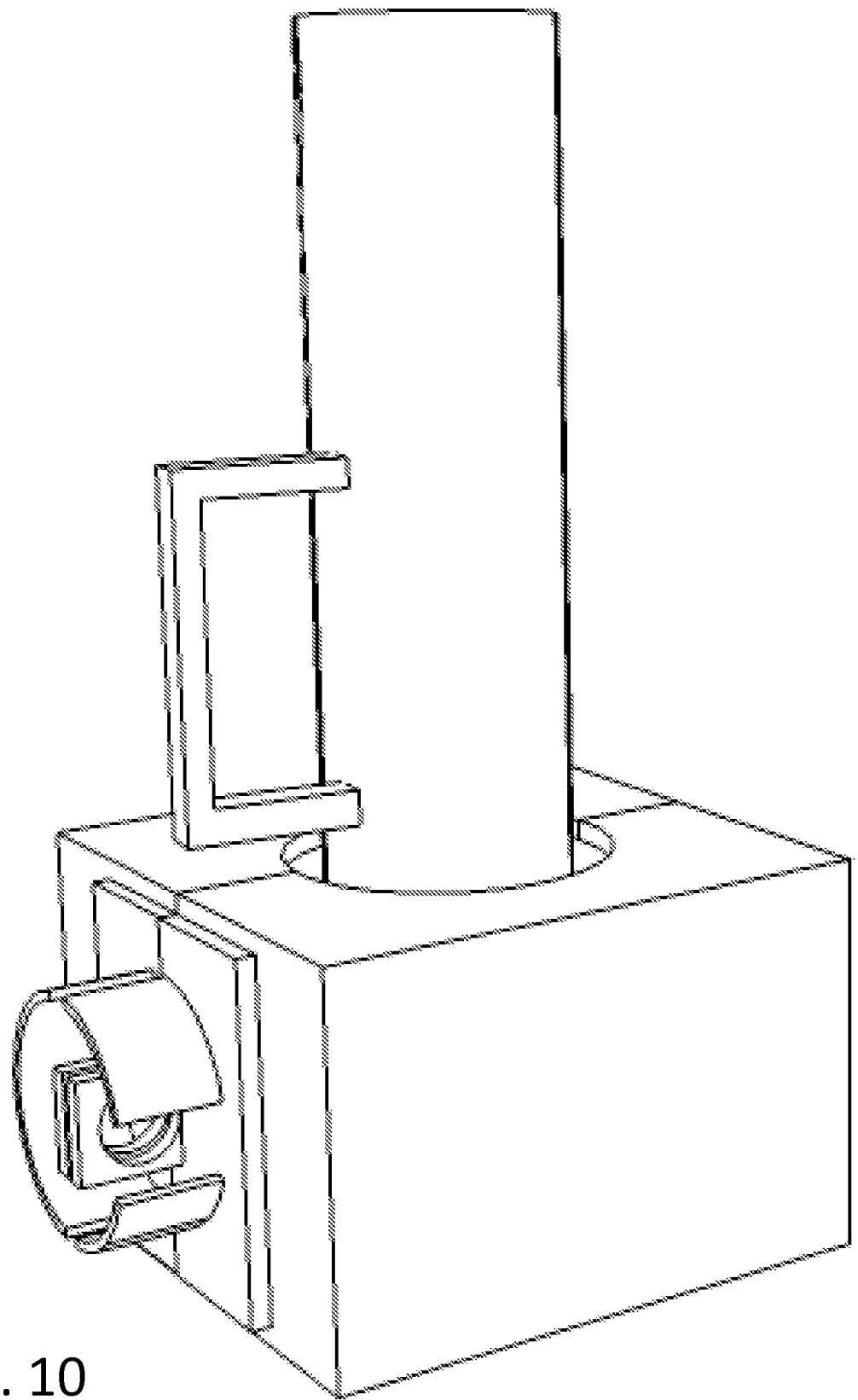
FIG. 10 illustrates a perspective view of an embodiment of the trailer coupler lock in a closed position with the hasp surround in view as it would appear on a gooseneck trailer coupler.

FIG. 10 illustrates a perspective view of the trailer coupler lock in a closed position with the hasp surround in view as it would appear on a gooseneck trailer coupler.

Figure 11:
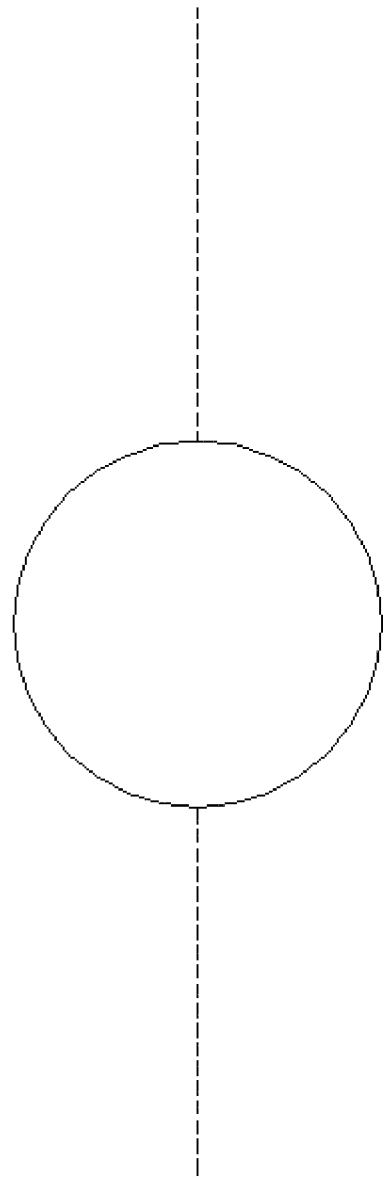
FIG. 11 illustrates a top view of a circle aperture cut.

FIG. 11 illustrates a top view of a circular aperture cut. The diameter of the circle cut may be any necessary span, but the diameter is preferably between 0.625-inches and 2.5-inches. The abutting edges of the enclosure box pieces are indicated by dashed line and positioning of the aperture cut in relation to the abutting edges of the box enclosure is by way of example only and may be altered as necessary.

Figure 12:
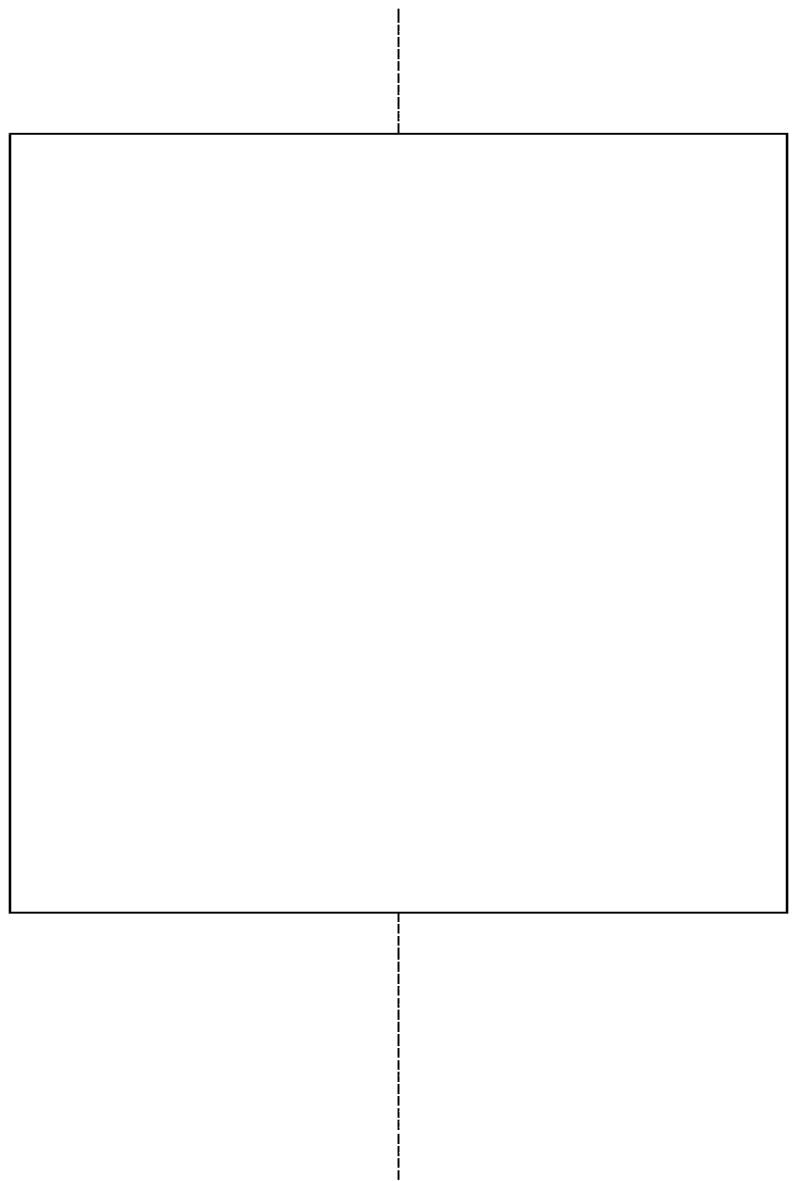
FIG. 12 illustrates a top view of a square aperture cut.

FIG. 12 illustrates a top view of a square aperture cut. The side length of the square cut may be any necessary length, but the side length is preferably 4.75-inches. The abutting edges of the enclosure box pieces are indicated by dashed line and positioning of the aperture cut in relation to the abutting edges of the box enclosure is by way of example only and may be altered as necessary.

Figure 13:
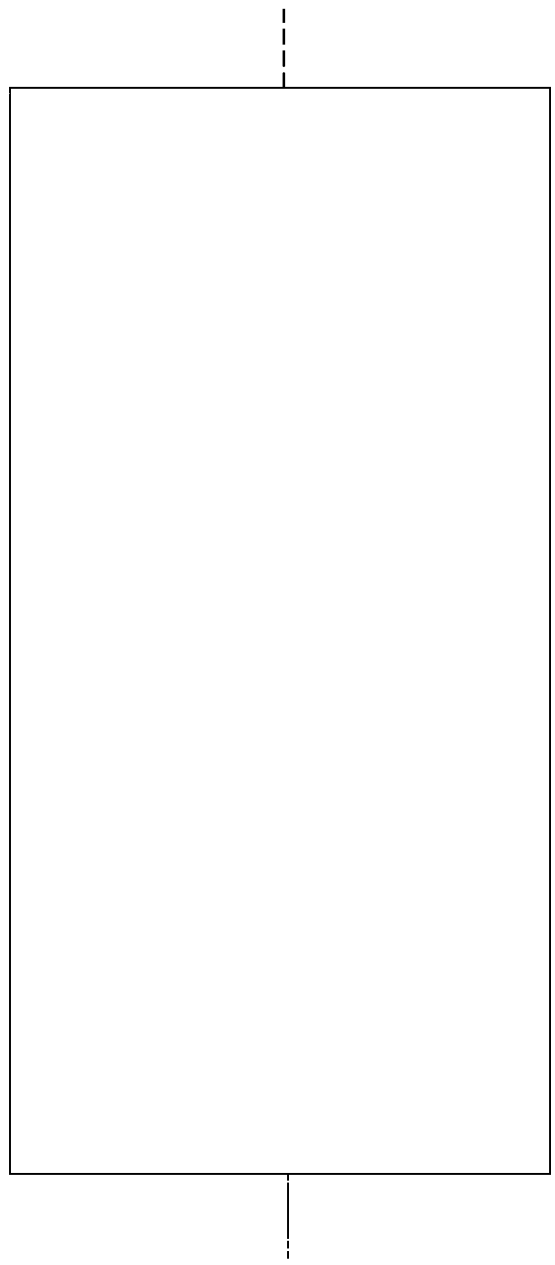
FIG. 13 illustrates a top view of a rectangle aperture cut.

FIG. 13 illustrates a top view of a rectangular aperture cut. The side lengths of the rectangle cut may be any necessary length, but the side lengths are preferably 4.125-inches and 8.25-inches. The abutting edges of the enclosure box pieces are indicated by dashed line and positioning of the aperture cut in relation to the abutting edges of the box enclosure is by way of example only and may be altered as necessary.

Figure 14:
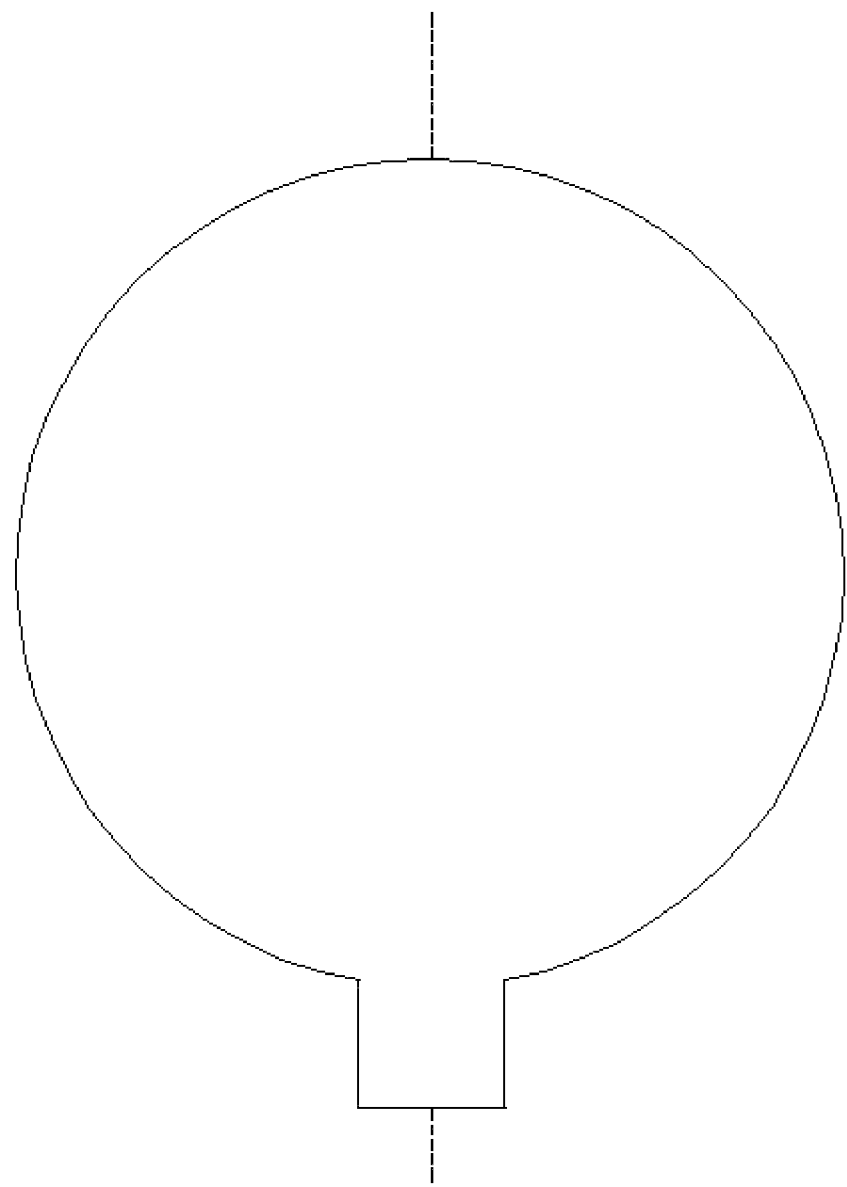
FIG. 14 illustrates a top view of a notched circle aperture cut.

FIG. 14 illustrates a top view of a notched circle aperture cut. The dimensions of the circular cut and rectangular or square cut of the notched circle may be altered as is necessary, but preferably the notched circle has a circular diameter of 4.25-inches and a notch 1-inch square. The abutting edges of the enclosure box pieces are indicated by dashed line and positioning of the aperture cut in relation to the abutting edges of the box enclosure is by way of example only and may be altered as necessary.

Figure 15:
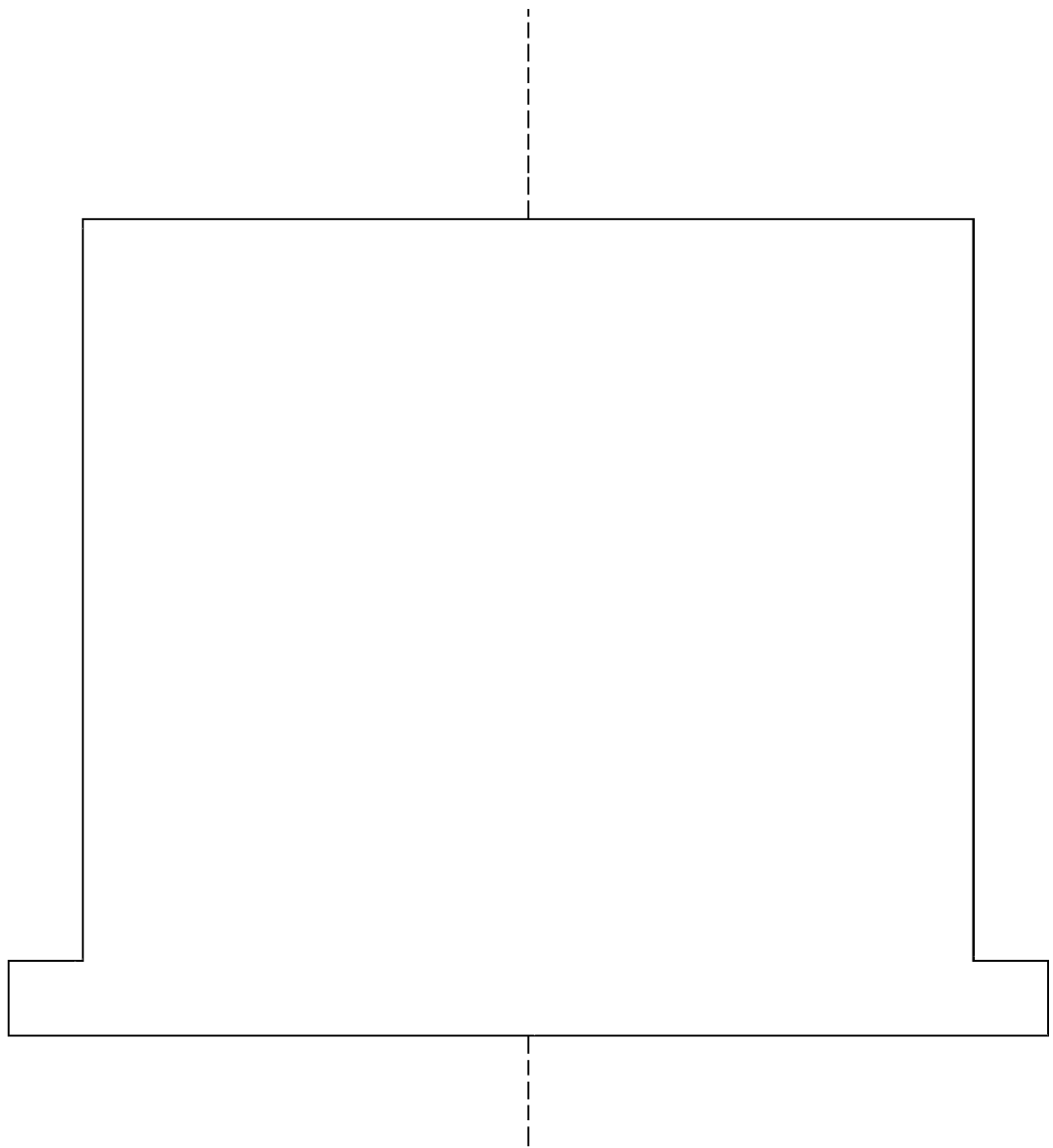
FIG. 15 illustrates a top view of an eared rectangle aperture cut.

FIG. 15 illustrates a top view of an eared rectangle aperture cut. The dimensions of the rectangular cut and ear cuts may be altered as is necessary, but the side lengths of the rectangle cut are preferably 3.0-inches and 2.75-inches and the side lengths of the ear cuts are preferably 0.25-inches. The abutting edges of the enclosure box pieces are indicated by dashed line and positioning of the aperture cut in relation to the abutting edges of the box enclosure is by way of example only and may be altered as necessary.

Figure 16:
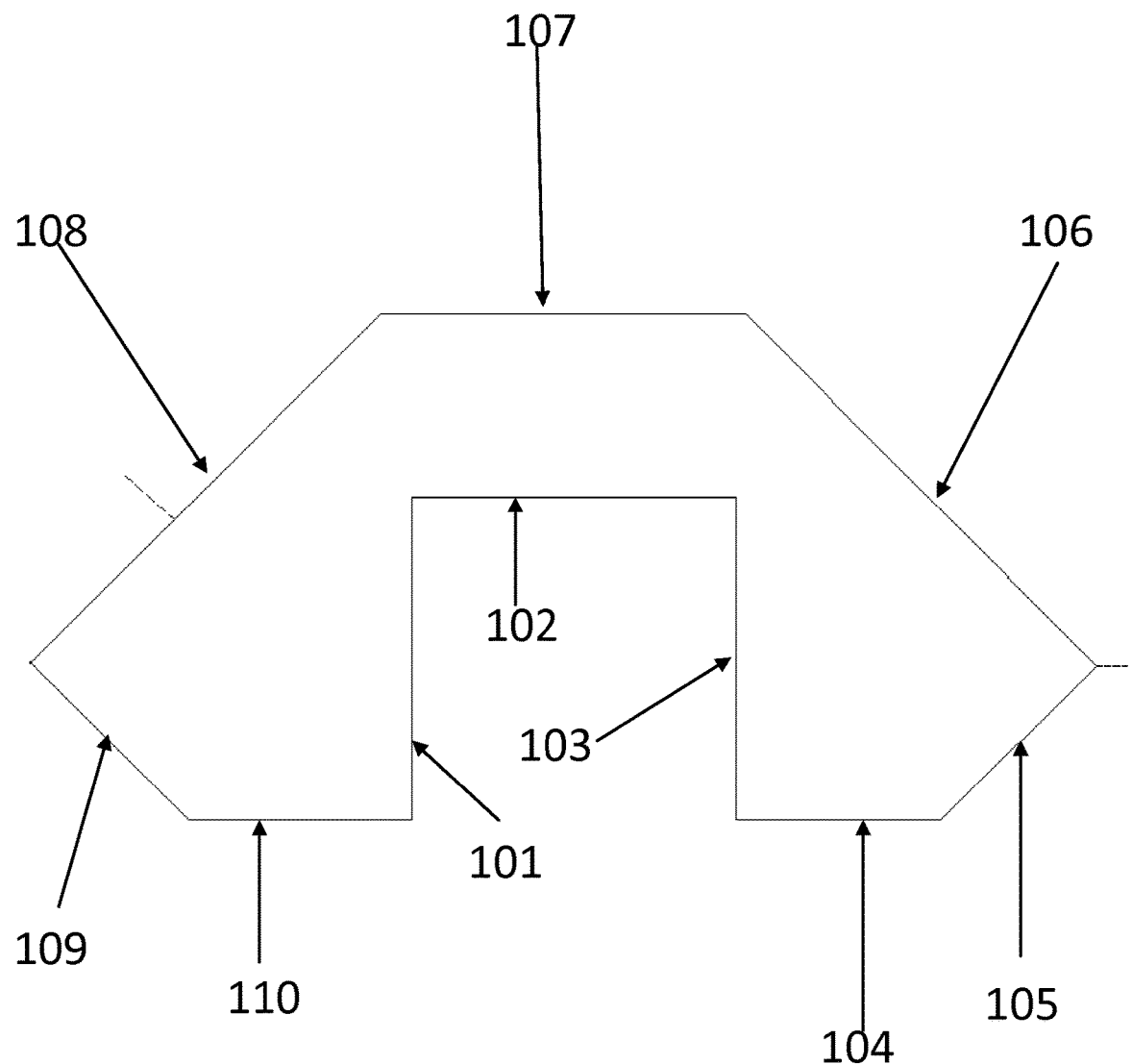
FIG. 16 illustrates a top view of a 10-sided irregular polygon aperture cut.

FIG. 16 illustrates a top view of a 10-sided irregular polygon aperture cut. The aperture cuts 101, 102, and 103 each preferably being 1.625-inches; cuts 104 & 110 each preferably being 1-inch; cuts 105 & 109 each preferably being 1.125-inches; cuts 106 & 108 each preferably being 2.5-inches; and cut 107 preferably being 1.75-inches. The abutting edges of the enclosure box pieces are indicated by dashed line and positioning of the aperture cut in relation to the abutting edges of the box enclosure is by way of example only and may be altered as necessary.

Figure 17:
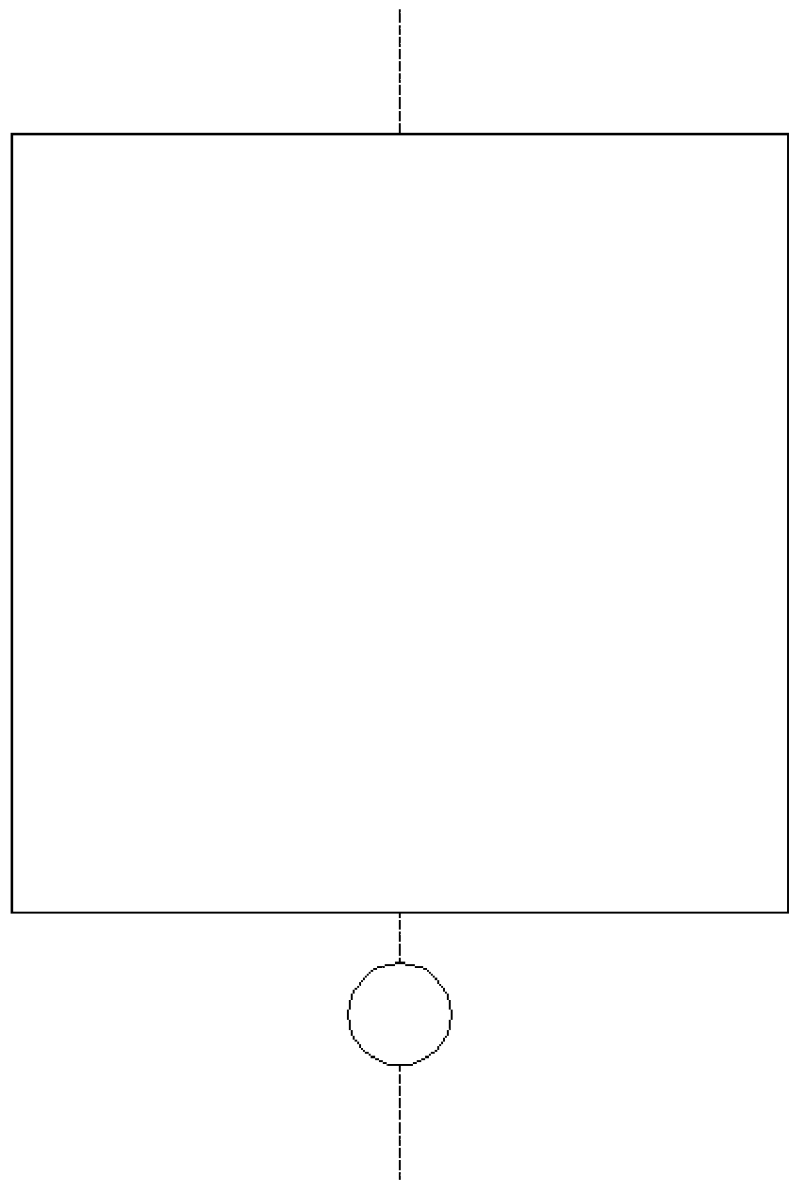
FIG. 17 illustrates a top view of a square and circle aperture cut.

FIG. 17 illustrates a top view of a square and circle aperture cut. The dimensions of the square cut and circle cut may be altered as is necessary, but the side length of the square is preferably 4.75-inches and the diameter of the circle is preferably 0.625-inches and preferably offset from the square by 0.25-inches. The abutting edges of the enclosure box pieces are indicated by dashed line and positioning of the aperture cut in relation to the abutting edges of the box enclosure is by way of example only and may be altered as necessary.

While the claimed subject matter has been described with a certain degree of particularity, it is to be noted that modifications may be made in the details of the claimed subject matter's construction and the arrangement of its components without departing from the spirit and scope of this disclosure. It is understood that the claimed subject matter is not limited to the embodiments set forth herein for the purposes of exemplification.

The invention claimed is:

1. A coupler lock comprising:
   (a) A hollow rectangular enclosure formed of a first piece and a second piece;
   (b) A hinge connecting said first piece and said second piece of said enclosure permitting said enclosure to be in a selectively open position or closed position;
   (c) A two piece hasp surround fixed on a side of said enclosure where said first piece of the enclosure and said second piece of the enclosure abut when in a closed position—one piece of said two piece hasp surround fixed on said first piece of said enclosure, and the second piece of said two piece hasp surround fixed on said second piece of said enclosure;
   (d) A first aperture located and formed on a side of said enclosure where said first and second pieces abut when in a closed position;
   (e) A second aperture located on one side of the enclosure that is adjacent to the side of the enclosure on which said first aperture is located; and
   (f) A channel connecting said first and second apertures, thereby forming a single multi-faced aperture spanning two sides of said enclosure.

* * * * *